United States Patent Office 2,719,139
Patented Sept. 27, 1955

1

2,719,139

POLYVINYL CHLORIDE-POLYSULFONE RESIN COMPOSITIONS

John E. Wicklatz, Bartlesville, Okla., assignor to Phillips Petroleum Company, a corporation of Delaware No Drawing. Application November 18, 1952,
Serial No. 321,267

12 Claims. (Cl. 260—45.5)

This invention relates to new resinous compositions of matter. In one aspect it relates to an improved polyvinyl chloride resin. In another aspect, it relates to a polyvinyl chloride-containing resin having improved moldability. In another aspect, it relates to a method of increasing the moldability of a polyvinyl chloride resin. In another aspect, it relates to a method of providing a cheap additive to improve the moldability or plasticity of a polyvinyl chloride resin. In still another aspect, it relates to a new mixed resin.

Polyvinyl chloride resins are known and have been used in the art for a variety of purposes such as the production of molded articles, sheet materials, coatings and the like. Polyvinyl chloride resins are valuable particularly on account of their chemical inertness. A pure polyvinyl chloride resin, however, can be molded only with great difficulty and, therefore, requires the addition of relatively large amounts of plasticizers such as dimethoxy diethyl phthalate, ethyl phthalyl ethyl glycollate (Santicizer E–15), dioctyl phthalate, and the like. Plasticizers of this type are of relatively low molecular weight and volatilize readily, thus being lost on storage or handling. Some are readily soluble in water and may be leached out when brought in contact with water.

This invention solves the problem of moldability of polyvinyl chloride resins by providing an additive which improves the moldability, does not volatilize, and is not leached out by water.

According to this invention, there is provided a novel resin comprising a major proportion of polyvinyl chloride and a minor proportion of a resin produced by the copolymerization of sulfur dioxide with an unsaturated organic compound.

The amount of unsaturated compound-sulfur dioxide resin added is in the range 5 to 50 weight per cent, preferably 10 to 25 weight per cent, based on the total weight of the two resins. The unsaturated compound-sulfur dioxide resins utilized according to this invention are those resins obtainable by the copolymerization of sulfur dioxide and an unsaturated compound such as an open-chain mono-olefin, a diolefin, an acetylenic compound, an unsaturated aliphatic nitrile and similar compounds. Such resins are producible by methods known in the art such as catalytic polymerization of the organic compound together with the sulfur dioxide in the homogeneous solution or by the emulsion polymerization method, as set forth in Crouch and Cotten application, Serial No. 8,755, filed February 16, 1948, now U. S. Patent 2,645,631 (1953). Although a wide variety of unsaturated organic compounds can be used to produce the unsaturated organic compound-sulfur dioxide resin, an especially satisfactory type of unsaturated compound is an open-chain mono-olefin. The mono-olefin used preferably contains from 3 to 12 carbon atoms per molecule and more preferably from 4 to 8 carbon atoms per molecule. The mono-olefins can be used in the pure state or commercially available mixtures such as refinery olefin cuts can be used. Examples of suitable olefins are 1-butene, 2-butene, propylene, pentenes, hexenes, heptenes, octenes, decenes. Olefin-$SO_2$ resins are often referred to as polysulfone resins.

2

Polyvinyl chloride resins are well known in the art and are commercially available materials.

Further in accordance with this invention, polyvinyl chloride resins of increased moldability can be obtained by mixing a powdered polyvinyl chloride resin with a powdered polysulfone resin in the desired proportions, heating the mixture and forcing it into a mold. After molding, the resin is cooled and recovered. The two powdered resins can be ground together and the mixture obtained can be heated and molded as previously stated. Another method of preparing the resins according to this invention comprises mixing a stabilized polyvinyl chloride latex with a polysulfone latex, coagulating the mixed resin by the addition of a suitable coagulating agent, recovering the coagulated mixture, washing the mixture, and drying. The dried resin can be ground or pulverized and subjected to injection molding or similar molding operations. Suitable coagulating agents are methanol, sodium chloride, calcium chloride, magnesium sulfate and the like. The resin compositions of this invention can also be employed advantageously to form relatively thin films which are useful in the packaging art, and the like.

It is also within the scope of this invention to add to the mixed polysulfone-polyvinyl chloride resin known additives such as additional plasticizers, coloring agents and thermal stabilization agents.

The mixed resins of this invention are readily moldable at lower temperatures than are ordinarily used for polyvinyl chloride alone. The resins obtained have improved color characteristics over the pure polyvinylchloride resins.

It is believed that the mixed resins produced according to this invention do not undergo chemical interaction during the mixing and molding steps. However, this fact has not been definitely established. Nevertheless, the resins obtained have the highly satisfactory properties set forth herein and the term "mixed resin" in this specificat    and in the claims is intended to cover the product obt.. ned by mixing and molding regardless of whether chemical interaction of the components occurs.

*Example I*

A polysulfone resin was prepared using the following emulsion recipe:

| | Parts by weight |
|---|---|
| Commercial 1-butene [1] | 55.5 |
| Sulfur dioxide | 88.3 |
| Water | 180.0 |
| Ammonium nitrate | 0.5 |
| Maprofix MM [2] | 0.6 |

[1] The commercial 1-butene had the following composition:

| | Mol per cent |
|---|---|
| 1-butene | 60.0 |
| 2-butene-cis | 2.7 |
| 2-butene-trans | 7.8 |
| n-Butane | 12.1 |
| Isobutane | 3.9 |
| $C_3$ | 0.7 |
| Isobutylene | 2.7 |
| Butadiene | 0.9 |

[2] Sodium laurylsulfate dispersing agent commercially available in the form of a paste containing about 60 per cent solids.

The polymerization was conducted for a period of seven hours at a temperature of 100° F.

At the end of the reaction period the reactor was opened and excess sulfur dioxide vented therefrom. Coagulation was effected with methanol; the resin was then recovered by filtration, washed and dried in air at 130 to 150° F. for 16 hours.

*Example II*

A series of compositions was made according to the teaching of the present invention using varying ratios of polyvinyl chloride and polysulfone. The polysulfone was made according to the procedure of Example I. The compositions so prepared were molded in an injection molding machine into discs 1.5 inches in diameter by 0.125 inch in thickness. The die cavities were provided with gates (openings to allow entrance of the resin into the die cavity) of .010 and .050 inch in width. Resin compositions, molding conditions and appearance of the molded pieces are recorded below:

| Compositions, Parts by Weight | | Molding Conditions | | | | Appearance of Molded Piece and Remarks |
|---|---|---|---|---|---|---|
| Polyvinyl Chloride [1] | Polysulfone | Cylinder Temp., °F. | Die Temp., °F. | Pressure, P. S. I. G. | Molding Time, Seconds | |
| 100 | -------- | 380 | 190 | 9,000 | 20 | Would not mold. Cavity with .010" gate approximately one-eighth filled. Cavity with .050" gate approximately two-thirds filled. Pieces black and badly charred. |
| 75 | 25 | 380 | 180 | 9,000 | 20 | Fully molded pieces; deep amber in color. Die cavities completely filled through both .010" and .050" gates. |
| 50 | 50 | 400 | 160 | 9,000 | 20 | Fully molded pieces; deep amber in color. Die cavities completely filled through both .010" and .050" gates. |

[1] Geon 101.

*Example III*

Several mixed resins were prepared by adding to a commercially available polyvinyl chloride resin (Geon) different proportions of a polysulfone resin prepared as described in Example I. Commercially available plasticizers were also added to the resins. The properties of the mixed resins, as compared with the properties of polyvinyl chloride resins containing commercial plasticizers are shown in the following table:

Plasticizers used in runs G, H, K, L, M, O, and Q in the foregoing table were found to be compatible with the mixed resin at higher concentrations than the plasticizers used in runs B, D, and E.

*Example IV*

The hardness and plasticity of several resins prepared in accordance with this invention are shown in the following table:

SERIES I.—UNPLASTICIZED BLENDS

| Composition of Resin Blend | Plasticizer | Hardness | Plasticity (sq. in.) |
|---|---|---|---|
| 100/0 Geon 101/1-butene-SO$_2$ resin | None | R119 | 1.37 |
| 90/10 Geon 101/1-butene-SO$_2$ resin | ----do---- | R117 | 1.92 |
| 75/25 Geon 101/1-butene-SO$_2$ resin | ----do---- | R116 | 2.65 |
| 50/50 Geon 101/1-butene-SO$_2$ resin | ----do---- | R118 | 3.43 |

PHYSICAL PROPERTIES OF POLYVINYL CHLORIDE-POLYSULFONE BLENDS

| Run | Geon 101, Parts | Polysulfone, Parts | Plasticizer, Parts | P. s. i. at— | | Percent Elong. | Gehman Freeze Point | Toughness |
|---|---|---|---|---|---|---|---|---|
| | | | | 100% Elong. | Break | | | |
| A | 100 | ---- | 20 DOP, 20 TOF | 1,900 | 2,940 | 300 | −22 | 530 |
| B | 80 | 20 | 20 DOP, 20 TOF | 1,520 | 2,100 | 250 | −35 | 320 |
| C | 100 | ---- | 25 DOP, 25 E-15 | 1,500 | 2,850 | 295 | −8 | 400 |
| D | 90 | 10 | 25 DOP, 25 E-15 | 1,470 | 2,640 | 260 | −10 | 360 |
| E | 80 | 20 | 25 DOP, 25 E-15 | 1,150 | 2,140 | 275 | −16 | 310 |
| F | 100 | ---- | 50 E-15 | 1,700 | 2,300 | 335 | −6 | 615 |
| G | 90 | 10 | 50 E-15 | 1,550 | 3,060 | 355 | −10 | 590 |
| H | 80 | 20 | 50 E-15 | 1,490 | 2,870 | 365 | −16 | 580 |
| I | 100 | ---- | 20 E-15, 30 Methox | 1,900 | 3,230 | 255 | −11 | 425 |
| J | 100 | ---- | 30 E-15, 20 Methox | 1,600 | 3,260 | 320 | −9 | 560 |
| K | 80 | 20 | 20 E-15, 30 Methox | 1,440 | 2,780 | 350 | −14 | 530 |
| L | 80 | 20 | 25 E-15, 25 Methox | 1,400 | 2,800 | 340 | −15 | 500 |
| M | 80 | 20 | 30 E-15, 20 Methox | 1,410 | 2,600 | 305 | −14 | 420 |
| N | 100 | ---- | 25 E-15, 25 TEC | 1,600 | 3,160 | 300 | −20 | 490 |
| O | 80 | 20 | 25 E-15, 25 TEC | 1,260 | 2,580 | 350 | -------- | 480 |
| P | 100 | ---- | 40 E-15, 10 TEC | 2,060 | 3,400 | 290 | −8 | 550 |
| Q | 80 | 20 | 40 E-15, 10 TEC | 1,320 | 2,840 | 370 | −16 | 530 |

NOTES:
TOF—trioctyl phosphate.
DOP—Di-(2 ethylhexyl) phthalate.
E-15—ethyl phthalyl ethyl glycollate.
Methox—Di-(2-methoxyethyl)-phthalate.
TEC—triethyl citrate.
Toughness—Ft.-lbs. of work to break specimen of 1.0 sq. in. cross-sectional area.

OBSERVATIONS:
1. All Geon-101-polysulfone blends require less pull for 100% elongation than Geon 101. This indicates that the plasticizer is more effective in the Geon-101-polysulfone blends.
2. In some instances the percent elongation is improved.
3. Gehman freeze point is generally lowered.
4. Toughness remains good.

SERIES II.—PLASTICIZED BLENDS (RESIN BLEND/PLASTICIZER=75/25)

| Composition of Rosin Blend | Plasticizer | Hardness | Plasticity (sq. in.) |
|---|---|---|---|
| 100/0 Geon 151/1-butene-SO₂ resin. | Santicizer 8* | R105 | 3.55 |
| 90/10 Geon 151/1-butene-SO₂ resin. | ___do___ | R90 | 4.72 |
| 75/25 Geon 151/1-butene-SO₂ resin. | ___do___ | R82 | 5.15 |
| 50/50 Geon 151/1-butene-SO₂ resin. | ___do___ | R92 | 5.15 |
| 100/0 Geon 151/1-butene-SO₂ resin. | Santicizer E-15** | R2 | 1.27 |
| 90/10 Geon 151/1-butene-SO₂ resin. | ___do___ | R17 | 5.28 |
| 75/25 Geon 151/1-butene-SO₂ resin. | ___do___ | R58 | 5.72 |
| 50/50 Geon 151/1-butene-SO₂ resin. | ___do___ | R41 | 6.30 |
| 100/0 Geon 151/1-butene-SO₂ resin. | Flexol DOP*** | R15 | 3.60 |
| 90/10 Geon 151/1-butene-SO₂ resin. | ___do___ | R44 | 4.60 |
| 75/25 Geon 151/1-butene-SO₂ resin. | ___do___ | R50 | 5.48 |
| 50/50 Geon 151/1-butene-SO₂ resin. | ___do___ | R11 | 6.48 |

SERIES III.—PLASTICIZED BLENDS (GEON 151/PLASTICIZER=75/25)

| Composition of Rosin Blend | Plasticizer | Hardness | Plasticity (sq. in.) |
|---|---|---|---|
| 100/0 Geon 151/1-butene-SO₂ resin. | Santicizer E-15 | R48 | 2.92 |
| 90/10 Geon 151/1-butene-SO₂ resin. | ___do___ | R29 | 4.32 |
| 75/25 Geon 151/1-butene-SO₂ resin. | ___do___ | R28 | 5.00 |
| 50/50 Geon 151/1-butene-SO₂ resin. | ___do___ | R101 | 4.53 |

*o- and p-Toluene ethyl sulfonamides.
**Ethyl phthalyl ethyl glycollate.
***Di-(2-ethylhexyl) phthalate.

The plasticity was determined in the following manner: A disc one inch in diameter and with a thickness of 0.60±0.005 inch was placed between two silver foil squares (5 inches on a side). This "sandwich" was preheated for exactly one minute at 255° F. and then 8000 p. s. i. pressure was exerted on the disc for exactly one minute. The flattened disc was quickly removed and quenched in cold water. After drying, an outline of the flattened disc was traced on graph paper. An outline of the original disc was also made prior to the above treatment. The difference between the area of the flattened disc and that of the original is taken as a measure of the plasticity.

The values in the column entitled "Hardness" are Rockwell hardness numbers.

The data in the foregoing table show that resins having satisfactory hardness and plasticity, in addition to improved molding properties, are produced in accordance with this invention.

Variation and modification are possible within the scope of the disclosure and claims to this invention, the essence of which is that a polyvinyl chloride resin of improved moldability is obtained by adding to said resin a resin produced by the copolymerization of sulfur dioxide with an unsaturated organic compound; and that a novel resin and a novel method of producing the same are provided.

I claim:

1. An improved resinous composition of matter comprising a major proportion of a polyvinyl chloride resin and a minor proportion of a resin produced by the copolymerization of sulfur dioxide with an unsaturated organic compound.

2. A polyvinyl chloride resin having improved moldability, said resin comprising a polyvinyl chloride resin and an olefin-sulfur dioxide resin, the amount of said olefin-sulfur dioxide resin being in the range 5 to 50 weight per cent, based on the total weight of said resins.

3. A mixed resinous composition comprising a polyvinyl chloride resin and an olefin-sulfur dioxide resin, said latter resin constituting from 10 to 25 weight per cent of the total weight of said polyvinyl chloride resin and said olefin-sulfur dioxide resin.

4. A resin in accordance with claim 3 in which the olefin-sulfur dioxide resin is a 1-butene-sulfur dioxide resin.

5. A resinous composition according to claim 3 in which said olefin-sulfur dioxide resin is a propylene-sulfur dioxide resin.

6. A resinous composition in accordance with claim 3 in which said olefin-sulfur dioxide resin is a pentene-sulfur dioxide resin.

7. A resinous composition in accordance with claim 3 in which said olefin-sulfur dioxide resin is a hexene-sulfur dioxide resin.

8. A resinous composition according to claim 3 in which said olefin-sulfur dioxide resin is a heptene-sulfur dioxide resin.

9. A method for molding a polyvinyl chloride resin which comprises adding to said resin a minor proportion of a resin produced by the copolymerization of sulfur dioxide with an unsaturated organic compound; subjecting the mixture so obtained to heating and molding; and recovering a molded resinous mass.

10. A method of molding a polyvinyl chloride resin which comprises adding to said resin a minor proportion of an olefin-sulfur dioxide resin; subjecting the mixture to molding; and recovering a molded resinous article.

11. A process for producing a molded resinous article which comprises mixing a powdered polyvinyl chloride resin with from 5 to 50 weight per cent of an olefin-sulfur dioxide resin, based on the total weight of the two resins; subjecting the mixture to molding; and recovering a molded article.

12. A process for molding a polyvinyl chloride resin which comprises mixing with a stabilized polyvinyl chloride latex a stabilized olefin-sulfur dioxide latex, the latices being mixed in such proportions that the mixture contains from 10 to 25 weight per cent of olefin-sulfur dioxide copolymer based on the weight of total copolymer present, subjecting the mixed latex to coagulation, removing coagulated material, washing and drying said coagulated material, grinding the dried material to a powder, subjecting said powder to molding, and recovering a molded resin.

References Cited in the file of this patent

UNITED STATES PATENTS

| 2,146,276 | Wilder | Feb. 7, 1939 |
| 2,372,299 | Snow | Mar. 27, 1945 |
| 2,593,414 | Crouch | Apr. 22, 1952 |

FOREIGN PATENTS

| 660,008 | Great Britain | Oct. 31, 1951 |